(12) United States Patent
Garg et al.

(10) Patent No.: US 10,013,504 B2
(45) Date of Patent: *Jul. 3, 2018

(54) SEARCH WITH AUTOSUGGEST AND REFINEMENTS

(71) Applicant: BloomReach Inc., Mountain View, CA (US)

(72) Inventors: Ashutosh Garg, Sunnyvale, CA (US); Anand Raghuraman, Campbell, CA (US); Vinodh Kumar Ravindranath, Bangalore (IN); Mohit Jain, Bangalore (IN); Christina Augustine, Palo Alto, CA (US); Gaurav Bhati, Bangalore (IN)

(73) Assignee: BloomReach Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,832

(22) Filed: May 27, 2016

(65) Prior Publication Data

US 2016/0350321 A1 Dec. 1, 2016

Related U.S. Application Data

(63) Continuation of application No. 14/092,567, filed on Nov. 27, 2013, now Pat. No. 9,384,244.

(60) Provisional application No. 61/730,802, filed on Nov. 28, 2012.

(51) Int. Cl.
*G06F 17/30* (2006.01)

(52) U.S. Cl.
CPC ...... *G06F 17/3097* (2013.01); *G06F 17/3053* (2013.01); *G06F 17/3064* (2013.01); *G06F 17/30864* (2013.01)

(58) Field of Classification Search
CPC ............. G06F 17/3097; G06F 17/3053; G06F 17/3064; G06F 17/30864
See application file for complete search history.

(56) References Cited

U.S. PATENT DOCUMENTS

| | | | |
|---|---|---|---|
| 7,487,145 B1 * | 2/2009 | Gibbs | G06F 17/3064 |
| 7,693,823 B2 * | 4/2010 | Liu | G06F 17/30864 706/8 |
| 8,019,746 B2 * | 9/2011 | Liu | G06F 17/30864 707/707 |
| 2008/0214166 A1 * | 9/2008 | Ramer | G06Q 30/0257 455/414.3 |
| 2010/0205550 A1 * | 8/2010 | Chen | G06Q 30/02 715/760 |

* cited by examiner

*Primary Examiner* — Jorge A Casanova
(74) *Attorney, Agent, or Firm* — Van Pelt, Yi & James LLP

(57) ABSTRACT

Techniques for search with autosuggest and refinements are disclosed. In some embodiments, search with autosuggest includes determining a plurality of potential query suggestions for a partially entered query string; and automatically suggesting a plurality of queries based on a query count for each of the queries. For example, the query count can correspond to a popularity of the query. In some implementations, the query count can be determined based on a number of times that the query was received, and the plurality of queries can be listed based on the popularity of each of the plurality of queries (e.g., to facilitate display of more popular queries higher in the list of suggested queries).

18 Claims, 16 Drawing Sheets

SEARCH WITH AUTOSUGGEST AND REFINEMENTS

CROSS REFERENCE TO OTHER APPLICATIONS

This application is a continuation of co-pending U.S. patent application Ser. No. 14/092,567, entitled SEARCH WITH AUTOSUGGEST AND REFINEMENTS, filed Nov. 27, 2013, which claims priority to U.S. Provisional Patent Application No. 61/730,802, entitled SEARCH WITH AUTOSUGGEST AND REFINEMENTS, filed Nov. 28, 2012, both of which are incorporated herein by reference for all purposes.

BACKGROUND OF THE INVENTION

Internet search generally refers to a process for searching for content on the Internet. For example, a web search engine is typically implemented using a software system that can search for content on the World Wide Web. The search results can be presented as a list of results.

Search engines can also be provided to search for content on a particular web site (e.g., using an embedded search engine, such as an embedded Google® search engine for that web site). For example, a merchant that provides products or services for sale on a merchant's web site can provide a search box that allows users to search for particular products or services provided by the merchant. The search results in this case will typically return results of web pages available on the merchant's web site and/or particular products or services provided by the merchant.

BRIEF DESCRIPTION OF THE DRAWINGS

Various embodiments of the invention are disclosed in the following detailed description and the accompanying drawings.

DETAILED DESCRIPTION

Figure 1:
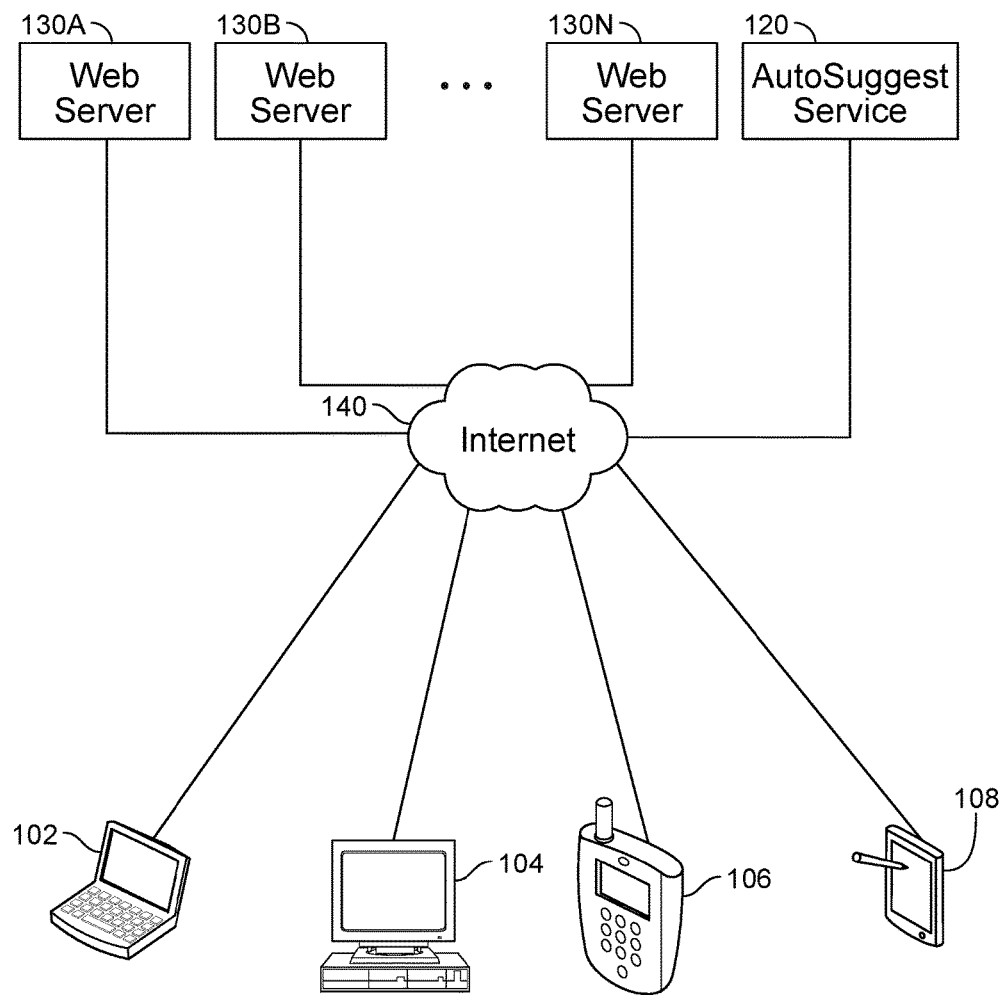
FIG. 1 is a block diagram illustrating an overview of an architecture of a system for providing search with autosuggest and refinements in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditional search engines utilized by enterprises (e.g., merchants or other enterprises) for their web sites and mobile sites typically rely on manual configurations and data entry to serve search results to end users. However, these manual processes can be error prone for a number of reasons. First, traditional search engines rely on the item (e.g., product, listing, etc.) descriptions and synonyms that have been manually entered. No natural language processing is included in these search engines to account for the numerous ways an item can be described (e.g., synonyms, bigrams, etc.). In particular, existing web site solutions generally require manual ranking and entry of data. For example, such approaches require manually listing products and similar products or ranking of products.

Additionally, these search engines contain manually entered rules meant to optimize the search results for the user. However, those rules are configured once and left in place. An improved solution would involve a continual and automatic optimization through machine learning so that the search engine is responsive to and optimized for current context (e.g., user demand and/or user context).

Finally, mobile solutions are challenging as users typically do not desire to type on such mobile devices. Also, mobile devices (e.g., smart phones, tablets, or other mobile computing devices) often have less screen space, and as a result, there is less screen space for presenting a long list of products to users (e.g., so efficient use of such limited screen space for providing such search results to users is important, and as such, ranking is generally important for mobile devices). Thus, as more users are accessing web content using a mobile device (e.g., accessing a merchant's web site through the mobile channel using a mobile device), the ability to present relevant search responses (e.g., search results) using a smaller screen space (e.g., to present relevance using few characters) is increasingly important. Current search engines often do not include suggestions to predict what the end user is looking for. By providing automatic suggestions or completion of the user's partially entered search query, users can access the relevant product/service faster and with less effort.

Accordingly, techniques for search with autosuggest and refinements are disclosed. In some embodiments, search with autosuggest includes determining a plurality of potential query suggestions for a partially entered query string; and automatically suggesting a plurality of queries based on a query count for each of the queries. For example, the query count can correspond to a popularity of the query. In some implementations, the query count can be determined based on a number of times that the query was received, and the plurality of queries can be listed based on the popularity of each of the plurality of queries (e.g., to facilitate display of more popular queries higher in the list of suggested queries).

For example, if a user is on a clothing merchant's web site, techniques disclosed herein can be used to suggest queries for when a user is typing in a partial query (e.g., a partially entered search query). If the user has entered "sh" on a search query input field, then various queries can be automatically suggested, such as "shoes," "men's shoes," "women's shoes," and/or various other suggested queries. As described below, various user demand, contextual information, and/or merchant customization can also be used to generate the suggested queries and/or refinements that may be responsive to a user's partially entered query or a user's initially entered query.

In one embodiment, search with autosuggest and refinements further includes dynamically optimizing search results for a merchant web site based on user demand for automatically suggesting the plurality of queries.

In one embodiment, search with autosuggest and refinements further includes determining a weight for each of the plurality of potential search query suggestions based on the query count.

In one embodiment, search with autosuggest and refinements further includes determining that the partially entered query string is associated with a product or category of a merchant web site.

In one embodiment, search with autosuggest and refinements further includes merging a plurality of categories associated with a merchant web site. In some cases, at least one of the automatically suggested plurality of queries can correspond to a merged category.

In one embodiment, search with autosuggest and refinements further includes determining a number of automatically suggested plurality of queries to return based on a device platform. For example, a few number of suggested queries (e.g., 3, 5, or some other number of automatically suggested queries) can be returned for a mobile device (e.g., a user executing a browser on a mobile device to access the merchant's web site).

In one embodiment, search with autosuggest and refinements further includes determining which suggested plurality of queries to return based on a user context. In some implementations, a user context can be used as contextual input for determining the suggested queries. For example, if a user is located in Florida (e.g., location information can be provided from a user's mobile device or using other techniques), the date of the user's search is received during the summer season, and the user's partially entered query is skates, then based on this user contextual related data, roller skates and roller blades can be suggested. In contrast, if the user contextual related data was for a user located in Colorado and the search query was entered during the winter season, then the same partially entered query can result in suggested queries of ice skates and hockey skates. In this example, the monitored and analyzed user context can be used to provide suggested queries that are responsive to the relevant user context. As another example, search with autosuggest can include providing a personalized autosuggest response to a user. In this example, automated generated query suggestions can be based on a user's past preference(s) even if site wide data may indicate a different autocompletion suggestion (e.g., assume that a male visits a merchant's web site and types in "sh," the automatically generated suggestion cased on the user's past preference(s) can be "men shoes" instead of "women shoes" even though the merchant's web site is popular for or typically browsed by users looking for "women shoes").

In one embodiment, search with autosuggest and refinements further includes providing various quality signals. For example, a product rank (e.g., signal rank) can be provided. As another example, a document boost and/or field boost can be provided.

In one embodiment, search with autosuggest and refinements further includes providing various manual override options. In some cases, manual overrides can be provided for certain queries. In particular, this feature can be used to allow for specifying queries and the list of products that should appear at the top for each of the suggested queries. For example, a merchant can configure such using a merchant override to allow for certain products to be promoted or featured, which can then be automatically displayed at the top of a list of the suggested queries.

In one embodiment, category refinements can be used for providing search with autosuggest and refinements. For example, a user can be provided with suggested queries based on a partially or completely entered user query (e.g., entered from a smart phone or other computing device using a search box on a merchant's web site). The user can then be presented with various category refinements, such as to search for a suggested query in various different refined categories, which may be closer matches to the user's desired search query target.

As further described below, these and various other features and techniques are disclosed for providing search with autosuggest and refinements.

FIG. 1 is a block diagram illustrating an overview of an architecture of a system for providing search with autosuggest and refinements in accordance with some embodiments. As shown, various user devices, such as a laptop computer 102, a desktop computer 104, a smart phone 106, and a tablet 108 (e.g., and/or various other types of computing devices that can access the Internet to browse, for example, merchant web sites), are in communication with Internet 140 to access various web sites provided by different web servers 130A, 130B, . . . , 130N (e.g., which can each serve one or more merchant web sites).

For example, the web servers can each provide a merchant's web site, which can offer various products and/or services for sale from the merchant. The merchant web sites can also include a search function that allows users to search content on the merchant's web site. For example, users can generally use the merchant web site's search function (e.g., via a search box, such as using an embedded Google® search on the web site or other search function).

The web servers can also subscribe to an AutoSuggest service 120 (e.g., which can be provided as a cloud based AutoSuggest search service for merchant web sites). In some implementations, the AutoSuggest service provides various techniques for search with autosuggest and refinements as disclosed herein. In particular, a web server can communicate a user's query (e.g., a partially entered query) to the AutoSuggest service (e.g., using an API for communications over the Internet between the web server and the AutoSuggest service, such as using secure data communications). In some implementations, the merchant's web site includes embedded code (e.g., JavaScript or other executable code) that is executed to facilitate the monitoring and interactions between the merchant's web site server and the AutoSuggest service. The AutoSuggest service can then determine suggested queries, which can be returned to the web server, and the web server can present one or more of the suggested queries to the user (e.g., as suggested queries in the user's browser below an embedded search box, or using other presentation techniques). In some implementations, the web server can select how many of the suggested queries to return to the user's browser (e.g., based on a device platform and/or other criteria, which can also include merchant specific criteria).

Figure 2:
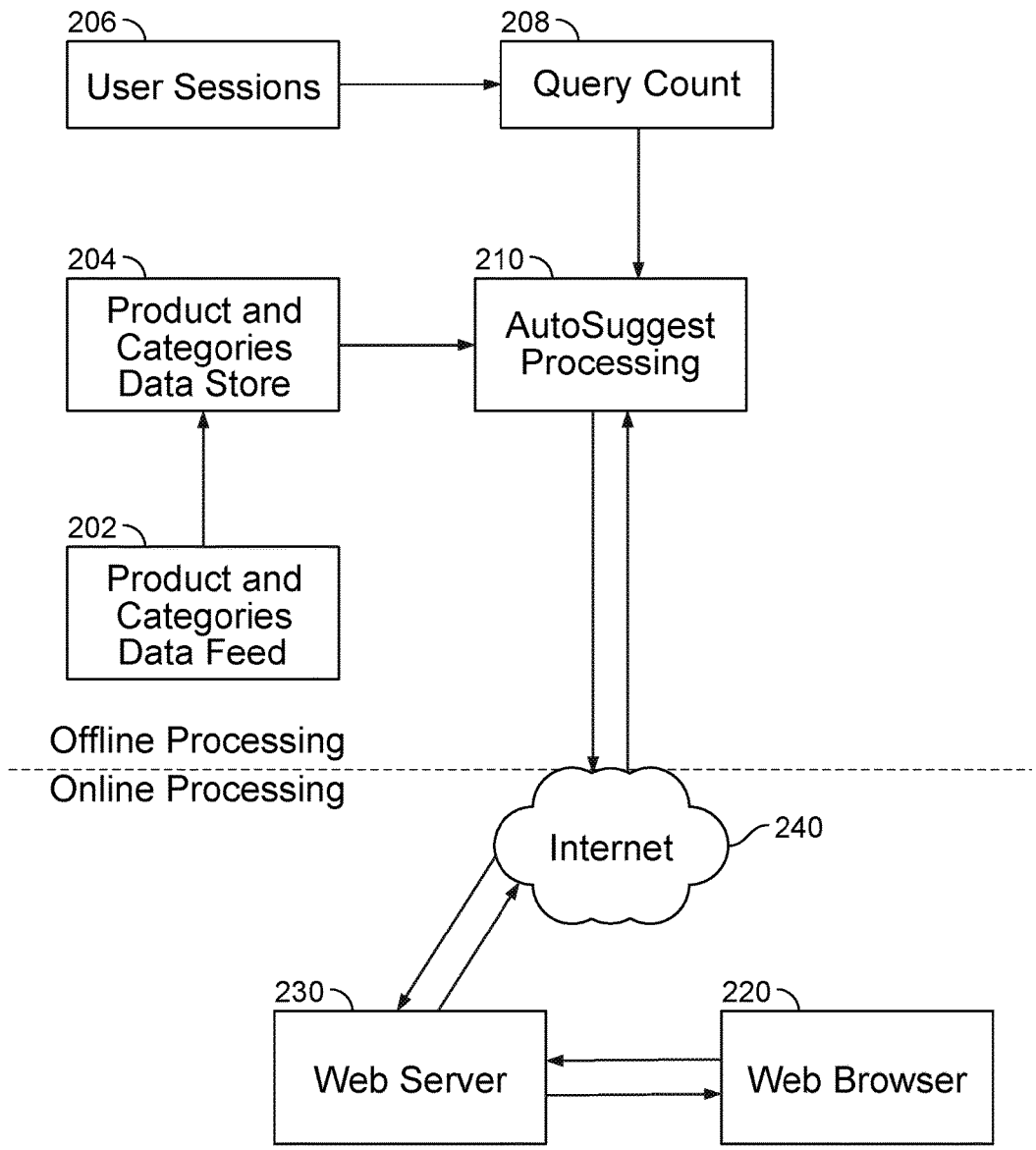
FIG. 2 is a functional block diagram illustrating a detailed view of an architecture of a system for providing search with autosuggest and refinements in accordance with some embodiments.

FIG. 2 is a functional block diagram illustrating a detailed view of an architecture of a system for providing search with autosuggest and refinements in accordance with some embodiments. In some implementations, an AutoSuggest service can be implemented by performing offline processing and online processing as shown in FIG. 2. As shown, offline processing includes receiving a product and categories data feed 202 from a merchant (e.g., a product catalog that lists products/services for sale by the merchant and any product category data maintained by the merchant), which can be stored in a product and categories data store 204 (e.g., a database, such as an open source or commercially available database or other data store). In some implementations, each merchant provides its respective product and categories data feed (e.g., periodically, such as hourly, daily, weekly, or at some other interval or as updates are needed). In some implementations, the product and categories data feed 202 is provided as an XML data feed or in some other format. The respective merchant product catalogs and categories data can be separately stored in the product and categories data store.

As also shown, user sessions data 206 is provided to query count 208. For example, user sessions can be monitored (e.g., using a pixel tag to monitor the behavior of users visiting a merchant's web site or using other techniques to monitor the behavior of users visiting a merchant's web site) and/or query log data can be collected (e.g., using query logs from commonly used search engines, such as Bing®, Google®, Yahoo®, and/or other search engines) to provide the user sessions data. The user sessions data can then be used to determine a count for each query. In particular, the user sessions data can be analyzed to collect all queries (e.g., queries submitted by users using merchant websites, search engines, etc.) and their content. The user sessions data can then be analyzed to generate counts for each submitted query (e.g., how many times a particular query string was submitted by a user, such as using a search engine or an embedded search engine on a given merchant's web site). Similarly, counts can also be generated for categories and/or products (e.g., providing separate counts for each time a particular category was viewed by a user on a given merchant's web site, and separate counts for each time a particular product was viewed by a user on a given merchant's web site). In some implementations, the query count function can be distributed across merchants (e.g., using a distributed implementation, which can support multiple merchant customers of the AutoSuggest service).

The product and categories data store and query count are provided as input for AutoSuggest processing 210. As further described below with respect to, for example, FIGS. 3 and 4, AutoSuggest processing can include various other processing techniques, such as cleaning (e.g., removing unimportant words or phrases, correcting misspellings, etc.), merging (e.g., merging queries with a category and/or merging multiple merchant categories into a single category), blacklisting (e.g., allowing a given merchant to blacklist one or more products that the merchant does not want to be shown or presented in response to a query), boosting (e.g., allow a given merchant to promote one or more products that the merchant wants to be shown or presented in response to a query), and/or various other processing operations to facilitate an automatic suggestion of queries.

The above-described processing can be performed offline as input to be used for online system processing, which is now described below. AutoSuggest processing 210 is in communication with a merchant's web server 230 via Internet 240. In particular, a user's web browser 220 (e.g., executing a computing device, such as a mobile computing device, a desktop computer, or other computing device) can communicate a query (e.g., a partially entered user's search query) to a merchant's web server. The web server can then communicate with the AutoSuggest processing service to determine which suggested queries to return to the user's web browser (e.g., to present to the user as a list of suggested queries and refinements to such a user's search query).

For example, if a user starts to type "sh" into a search field on a merchant's web site, then the AutoSuggest system can provide the following suggested queries, which can be sorted by popularity (e.g., query count), such as the following suggested search queries: "shoes" (e.g., query count=1000, which matches a merchant category); "shoes on sale" (e.g., query count=500); and "red shoes" (e.g., query count=250). In some implementations, a positional weight is also used to determine suggested queries, as further described below.

As another example, assume that a sporting goods merchant creates a new category for new Brand X baseball products that are newly added to the merchant's catalog. Also assume that the sporting goods merchant has not yet started advertising for the new Brand X baseball products. Now assume that a popular Major League Baseball player (e.g., with a lot of followers on the Twitter® service) sends a tweet about the new Brand X baseball products. The AutoSuggest system described herein can facilitate identifying a new influx of queries that are directed towards the new Brand X baseball products to automatically autosuggest a new Brand X products category for the website users for the sporting goods merchant's website.

Figure 3:
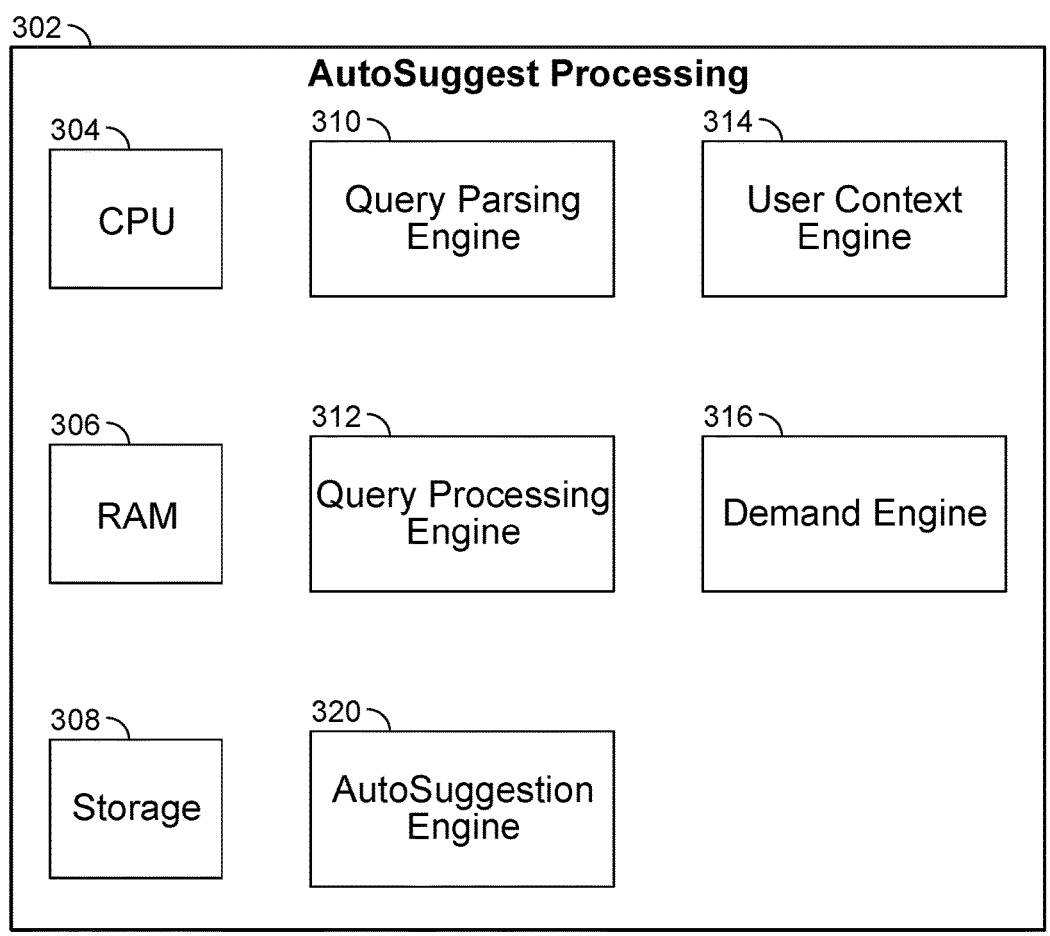
FIG. 3 is a functional block diagram illustrating an AutoSuggest processing system for providing search with autosuggest and refinements in accordance with some embodiments.

FIG. 3 is a functional block diagram illustrating an AutoSuggest processing system for providing search with autosuggest and refinements in accordance with some embodiments. As shown, AutoSuggest processing system 302 includes a CPU 304, a RAM 306, and a data storage 308. As also shown, the AutoSuggest processing system includes a query parsing engine 310 (e.g., EDisMax query parser can be used to rewrite queries to facilitate generation of appropriate scoring of documents as further described below), a query processing engine 312 (e.g., for performing various processing on search queries, such as query cleaning, blacklisting, and merging related query processing functions as further described below, which can be implemented as one or more query processing engines that can be implemented to perform one or more of any of such particular query processing functions as also further described below), a user context engine 314 (e.g., for determining a user context as further described below), a demand engine 316 (e.g., for determining a user demand as further described below), and an autosuggest engine 320 (e.g., for determining suggested queries, which can use input received from the query parsing engine, the query processing engine, the user context engine, and/or the demand engine, as further described below), which are each further described below. In some implementations, one or more of these functions can be performed by another device or function, such as the query parsing engine can be performed using another device or function (e.g., using a commercially available or open source query parsing tool), which can provide the parsed query data to the AutoSuggest processing system. In some implementations, the AutoSuggest processing system is implemented using the Apache Solr open source framework as further described below with respect to FIG. 4.

For example, AutoSuggest processing system 302 can implement the AutoSuggest service 120 described above with respect to FIG. 1 and can also be used to implement the AutoSuggest processing service 210 described above with respect to FIG. 2. For example, a received user query (e.g., a partial user query entered by a user on a merchant's web site using the merchant's search box) can be processed using CPU 304 and RAM 306 to automatically generate suggested queries that can be stored in storage 308 and communicated to the merchant's web site for presenting to a user via the user's web browser executed on the user's computing device.

Figure 4:
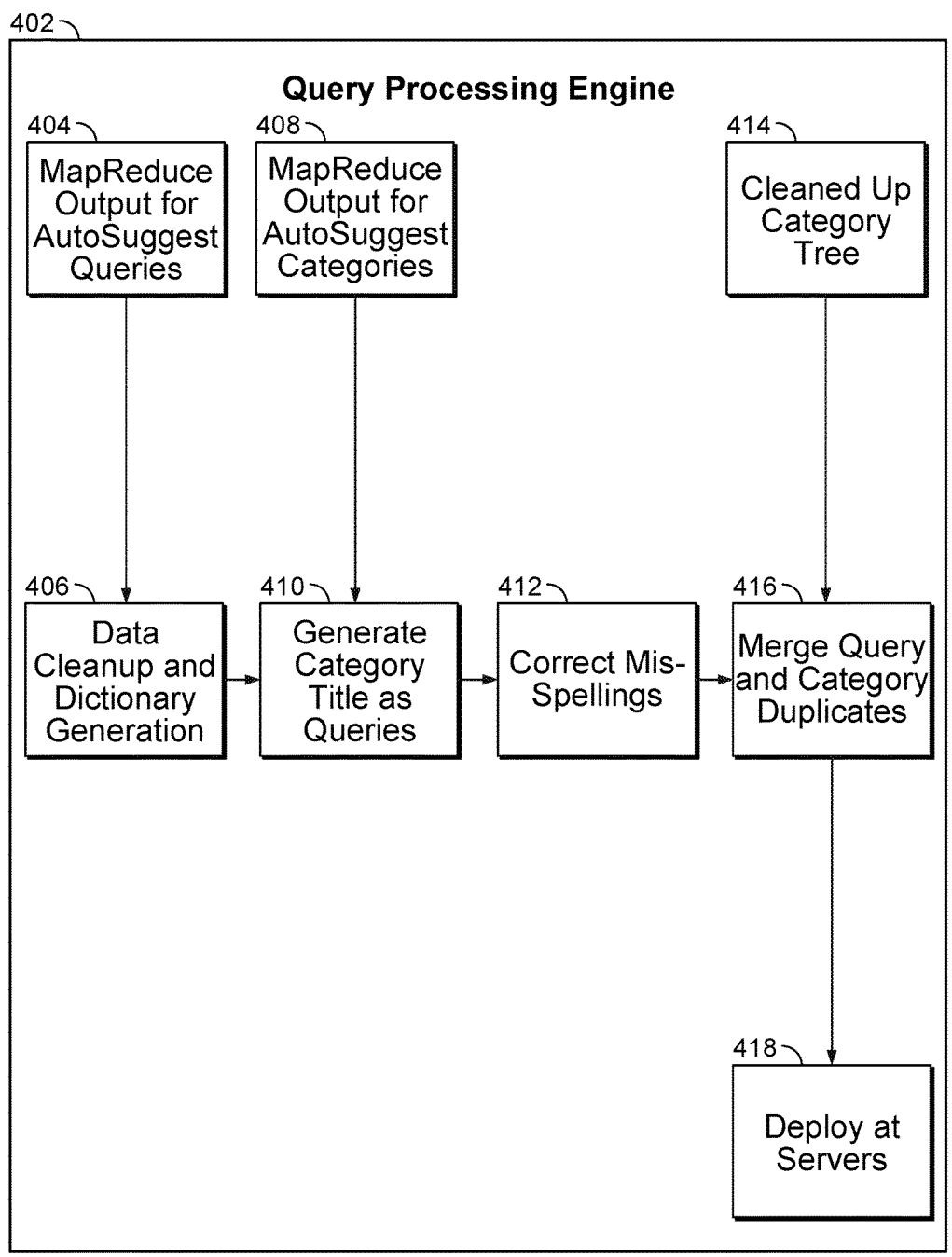
FIG. 4 is a functional block diagram illustrating a process flow of a query processing engine for providing search with autosuggest and refinements in accordance with some embodiments.

FIG. 4 is a functional block diagram illustrating a process flow of a query processing engine for providing search with autosuggest and refinements in accordance with some embodiments. In particular, FIG. 4 illustrates various components used for providing search with autosuggest and refinements in accordance with some embodiments. As shown, a query processing engine 402 receives a MapReduce output for Autosuggest queries at 404 for data cleanup and dictionary generation at 406. As also shown, query processing engine 402 receives a MapReduce output for AutoSuggest categories at 408 that along with the input from stage 406 is used to generate a category title(s) as queries at 410. At 412, misspellings can be corrected (e.g., using a Levenshtein distance algorithm for measuring a difference between two string sequences to determine misspellings in search queries, or other techniques can be applied to automatically identify and correct misspellings). At 414, a cleaned up category tree (e.g., implemented using a Solr tree index or using another commercially available or open source search framework/platform) is provided as input at 416 to merge query and category duplicates (e.g., duplicate queries can be merged and/or duplicate categories can be merged). At 418, the resulting queries and categories are deployed at servers (e.g., one or more servers used to implement a distributed AutoSuggest service, such as the AutoSuggest service 120 as shown in FIG. 1). Each of these process stages are described in further detail below.

For example, query processing engine 402 can implement the query processing engine 312 described above with respect to FIG. 3, which can implement a query processing component of an AutoSuggest service/system as similarly discussed above with respect to FIGS. 1 and 2.

In one embodiment, generating suggested queries/categories is performed as an offline process as similarly discussed above with respect to FIG. 2. In some implementations, pixel logs can be used as well as category titles and other product information to generate queries. For example, the suggested queries can be generated to look more like user generated search queries than actual bread crumbs or categories as further discussed below.

In one embodiment, queries are generated in the following manner as output for AutoSuggest queries (404). For example, a MapReduce output can be implemented over the last 3 months (e.g., or some other period of time) of pixel logs to collect queries and determine the query counts for each collected query. In some cases, both internal and external queries can be collected and counted. For example, external queries can include queries entered using search engines (e.g., Bing®, Google®, Yahoo®, and/or other search engines) and/or ad clicks. Internal queries can include searches performed by users that were entered on a particular merchant's web site (e.g., which can be provided using a configuration file that can specify a search URL pattern for the merchant). Counts can be used as weights associated with each collected query (e.g., as a popularity related weighting metric that can be associated with the query).

In one embodiment, the MapReduce output for AutoSuggest queries data is cleaned up and dictionary generation is performed in the following manner (406). Punctuations and other stray characters are removed. Appropriate casing of queries is performed. Incorrect queries are filtered. For example, incorrect queries can include queries with misspellings. An index (e.g., a Solr index can be used) with item information is obtained. Queries can then be looked up against the Solr index to filter out misspelled queries and/or otherwise bad queries.

In some implementations, stop words specific to a particular merchant's web site can be identified and removed from the queries. For example, a black list can be a manual list that is configured for each particular merchant's web site to configure such stop words (e.g., black listed words) that are then associated with the merchant's name and/or merchant's domain name for the merchant's web site. For example, to remove identified stop words, the system can perform offline processing as follows: if Q is the original suggested query generated from the data collection process, then after cleaning Q, an internal lookup data structure can store Q'. The system can also perform the following online processing: if a user types a few words, then identified stop words can be automatically removed from the user's input and sent to the lookup for suggestions.

In some implementations, duplicate forms of the same query are removed. For example, singular versus plural forms of the query can be determined to be duplicate forms of the same query, and further processing can be performed to determine whether to remove the singular version or the plural version of the same query. In some cases, between the singular and plural version of queries, the version with higher query count can be preferred, and thus, the version with the lower query count can be removed (e.g., in which the query counts for each version are counted and associated with that version to determine query counts for each of the singular and plural versions of the query). In some implementations, stemming can be performed to determine whether the two variants end up with the same stem and then the longer word can be selected. As another example, queries containing the same words ordered differently can be determined to be duplicate forms of the same query. Such can be addressed using the following approach: for every query, the query can be rewritten by sorting words in a query alphabetically. Duplicate query entries can then be removed, in which the query with the highest count can be retained, and associated with the total query count that includes also adding counts that are associated with the removed duplicated queries into this total query count.

In one embodiment, generating a category title as queries (e.g., as a suggested query) is performed in the following manner (410). For example, a query can be generated from category information received in the product and category data feed from a given merchant. A weight can be the associated page views for the category pages corresponding to that query. Various ways of generating the query are disclosed. In particular, queries can be generated that lead to a category page, which can be monitored using pixel logs (e.g., using MapReduce output for AutoSuggest categories (408)). Queries can also be generated from the category title from category pages. For example, a combination of words (n-grams) can be used for category breadcrumbs, and/or other fields can be used, such as a keywords field. For each query, the weight can be configured to be equal to a number of page views for that category page. As a result, a higher weight can be given for these queries (e.g., generic queries can be weighted higher than queries for specific products).

In one embodiment, misspellings are corrected in the suggested queries and performed in the following manner (412). For example, a Levinshtein distance algorithm implementation can be performed to identify and correct any typographical errors or misspellings in the suggested queries. In some implementations, further processing can be performed at this stage to also verify that there are no pornographic queries or other bad/inappropriate queries in the suggested queries. For example, a profanity words text file can be applied to filter the suggested queries. In some implementations, additional random sampling and manual verification can also be performed to verify that there are no pornographic queries or bad queries in the suggested queries.

In some implementations, the categories can be precomputed for each query and stored in a cleaned up category tree (414) (e.g., using an in-memory dictionary of a Solr implemented Suggester function). For example, this process can be performed as an offline process in the following manner using the facets feature of Solr. First, load a Solr index of the product feed. Then suppose an item belongs to a category C1→C2→ . . . Cn. This category information can be indexed as follows. In schema.xml, a multivalued field called "category" can be defined. Next, generate all prefixes of this category and index the following: C1; C1→C2; C1→C2→C3; . . . ; and C1→C2 . . . Cn. Additionally, ensure that no transformations (e.g., filters or tokenizers) such as stemming are applied on this field. Next, perform a faceted query against the index and obtain counts of the category prefixes (e.g., q=q1&facet.field=category where q1 is the query from the dictionary). Suppose results contain the following facets and associated count: C1→c; C1→C2: x; C1→C2→C6: y; C1→C3: z; and C1→C4→C5: w. Compute the least common prefix of these facets. In the above example, it would compute to C1. Now the sub categories for this query would be one level deeper than C1 (e.g., (C2, C3, C4), which can be loaded by the Solr Suggester). Finally, sub-categories that have a number of results (e.g., or weight) less than a threshold value (e.g., which can be configured as a global or a merchant specific threshold value, or can be configured at a more granular and/or dynamic level) can also be filtered out.

In one embodiment, the merge of query and category duplicates in the suggested queries is performed in the following manner (416). In some implementations, multiple categories can be merged into a single category. For example, a category for "shoes" and another category for "shoes on sale" can be merged into a single category for "shoes" (e.g., assuming, for example, that both categories include the same set of products of shoes, but given limited screen space on mobile devices, it can be desirable to reduce such to a single category suggestion that can be provided using the various AutoSuggest techniques described herein, in which, for example, a mobile web suggestions space may only have space for a limited number of suggestions, such as three or five suggestions).

In some cases, related queries with no word matches can be generated as a suggested query. For example, the Solr Suggester can suggest queries related to the words that a user is typing into a query that have no word match with the words in the query itself. As an example, a synonym suggestion can be provided. For example, assume that a user types in "couch" in a query string, and assume that a merchant has products that are called "sofas," then the Solr Suggester can suggest "sofa" in the suggested query. As another example, assume that a user types in "bangles" in a query string, then the Solr Suggester can suggest "Christmas gifts" if the search was around Christmas time. In some implementations, a file is provided that can be used as input by the Solr Suggester that is filled with these related query suggestions. For example, the "related" queries file can include the following detail for each query: Q, R, and W, where Q is the query, R is the related query, and W is the weight associated with this query suggestion. Details on how the online retrieval can be implemented are discussed further below.

In one embodiment, retrieval of suggested queries (e.g., query/category suggestions) is performed as part of an online process. In some implementations, Solr provides a mechanism to load a dictionary file, in which the dictionary file can include queries and weights using the Suggester class. In addition, "category" information can be loaded from a separate query→categories file that was generated as discussed above. A third input file that can be provided for use by the Suggester is the "related" queries file as also discussed above.

In particular, a look-up at runtime can be performed using a Lookup class. However, an issue with current implementations of the Lookup class is that such implementations generally only support prefix matching. In order to support matching of words even in the middle of the query, the following can be performed to support a more robust matching technique that can use positional weights. The dictionary can be loaded in the following fashion. Suppose there is a query q=w1, w2, . . . , wn with weight W in the dictionary file and category information C in the categories file. The following Suggester entries (key, value pairs) can be created. In some cases, the key is a string (e.g., including multiple words) and a value includes various information, such as query, category information, and weight. For simplicity, assume that the value just includes the following information: query and weight.

Key→Value
w1 . . . wn→(q, W*position_weight(1))
w2 . . . wn w1→(q, W*position_weight(2))

w3 . . . wn w1 w2→(q, W*position_weight(3))
. . .
wn w1 . . . wn−1→(q, W*position_weight(n))
where position_weight is defined as described below.

In other words, for each query, the words in the query are circularly rotated and stored in memory in the Solr Suggester dictionary.

In addition, for queries that have related queries, the following entry can be created:
w1 . . . wn→(R, W)
where R is the related query and W is the weight identified in the related queries file.

In this example, position_weight(x) is defined as shown below:
position_weight(1)=1
position_weight(n)=0.2
The rest of the values in between can be distributed in steps between these two values.

As a result, using this approach, matches starting right at the beginning of the query can be weighted higher than matches starting at any other position within the query.

In some cases, there can be duplicate entries with the same key, but with different values. In such cases, the entries can be merged as described below. Assume the following duplicate entries:
x→(q1, w1)
x→(q2, w2)
. . .
x→(qn, wn)
Select the top 'y' entries (e.g., top ten entries or some other number of entries) sorted by the weights. The selected top ten entries can be merged into one single entry: x→(Q, sum(w)) where Q is a list of all the queries in the top ten entries and sum(w) is the sum of all the weights associated with these queries. The value field in the dictionary entry is now actually a query list associated with corresponding categories and a weight. During lookup, the match happens against this dictionary. In this implementation, the "query" stored in the value field above is returned (not the key, as the keys are actually suffixes).

Various other design related search and refinements are provided as will now be described. In particular, various quality signals can be provided to facilitate autosuggest with refinements.

In one embodiment, a product rank (e.g., signal rank) of a product is provided. For example, the product rank can be used to indicate a query independent "importance" of the product. In some implementations, product conversion information (e.g., number of purchases for the product, revenue for the product, and/or other product conversion related data) plus page visit information for the product item (e.g., number of times users visited the product page(s) on the merchant's web site for the product item) can be used to generate a product rank value. For example, the product rank can be computed using a configurable algorithm that uses the following inputs: a number of page views of the product over one or more time periods (e.g., in some cases, with the importance decaying for older time periods, which can be configurable by the merchant based on the product item and/or generally for their products or types of products); a number of interactions the product has in a purchase funnel (e.g., add-to-cart, checkout, quantity purchased, sale, etc.); product review information; and/or product return information.

In one embodiment, a field boost is provided such that for query matches that match strings in certain fields of a document (e.g., a web page or other content on a merchant's web site), a higher boost can be allocated to those matches with such certain fields of the document. For example, a title match can be weighted higher as opposed to description match. Example fields that can be allocated higher weighting include the following: color (e.g., color of the product item); item name (e.g., name of the product); manufacturer or brand name (e.g., product brand); and/or keywords. In some implementations, exact values allocated for such field boosts can be determined through various tuning operations (e.g., replay frequent/popular queries to determine such boost value(s) for various fields, which can vary for different fields, for different merchant web sites, and/or using various other feedback loop and testing techniques for tuning such boost value settings).

In one embodiment, the queries that lead to an item page are computed historically using pixel logs and add queries as a separate field to the document along with a boost proportional to the number of visits through these "navigational" queries. This approach can facilitate in obtaining information related to the item such as query variants, spelling mistakes, user description of product, etc.

In one embodiment, field boosts are provided, which can be computed as discussed above. For example, Solr allows setting a field boost value for each field in a document. In some implementations, this can be implemented as a global value as discussed above.

In one embodiment, a document boost is equal to the product rank of the product, which can be computed as discussed above.

In one embodiment, various document scoring techniques are provided. For example, the Solr Extended DisMax (eDisMax) query parser can be used to rewrite queries to generate appropriate scoring of documents. Query field boosts and phrase match boosts, as well as boosting using values retrieved from certain fields in the index can be implemented using an open source query parser, such as Solr eDisMax or another open source or commercially available query parser. As would now be apparent to one of ordinary skill in the art, exact values of these parameters can be tuned for different implementations.

In one embodiment, Inverse Document Frequency (IDF) techniques can be applied to provide IDF removal. In some implementations, IDF can be used by a default similarity function to score matches on each field. However, there are certain fields for which it can be undesirable to have IDF to play any role, such as for a product color, category, and/or other fields that can be important for providing autosuggest with refinements even if the terms may be frequently used terms. An example of this situation is for colors for products, such as a color red for products, such as red dresses or red shoes, as red is a common word, but in this application, red is important in this context. As such, in this context, a common word, such as red, can be determined to be important for such queries. Accordingly, in some implementations, a custom similarity function is provided that returns an IDF of 1 for such fields.

In one embodiment, manual overrides can be used for providing autosuggest with refinements. In various situations, manual overrides can be provided for certain queries. In some implementations, use of the QueryElevationComponent feature of Solr can be used to implement such manual overrides. In particular, this feature allows for specifying queries and the list of products that should appear at the top for each of the suggested queries. For example, a merchant can configure such using a merchant override to allow for certain products to be promoted or featured (e.g., or, in some cases, demoted), which will then be automatically displayed at the top of a list of relevant autosuggested queries.

In one embodiment, category refinements can be used for providing autosuggest with refinements. In some implementations, sub categories can be defined for refinement on a query q. The facet-field can be set to be "category." This provides category prefixes with counts. The longest category prefix with the largest count can be selected. The subcategories of this longest category prefix are the refinement options to be generated using autosuggest with refinements. In particular, this can be performed post search and after faceted results are available.

Figure 5:
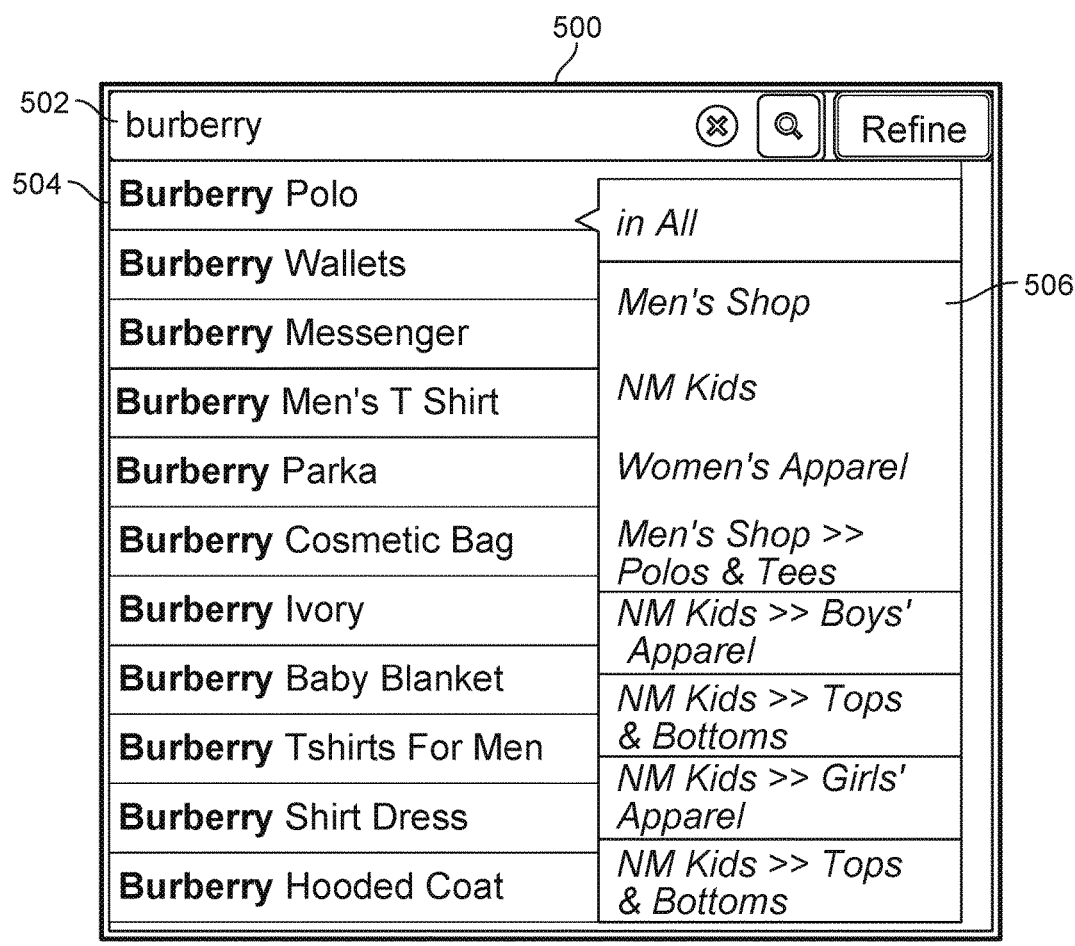
FIG. 5 is a screen diagram illustrating a search box of a graphical user interface (GUI) of a web interface for providing search with autosuggest and refinements in accordance with some embodiments.

FIG. 5 is a screen diagram illustrating a search box of a graphical user interface (GUI) of a web interface for providing search with autosuggest and refinements in accordance with some embodiments. In particular, FIG. 5 illustrates a screen image 500 of a front-end display associated with a search box 502 (e.g., showing burberry was entered into the search box), auto suggestions 504 (e.g., showing various autosuggested queries, such as Burberry Polo, Burberry Wallets, etc.), and refinements 506 (e.g., showing various refinements, such as in All, in Men's shops, etc.). As shown, a two-column format for search suggestions is provided to save the user a step in the refinement process. Various other formats can be provided to present automatically suggested queries and/or refinements as would now be apparent to one of ordinary skill in the art.

Figure 6A:
FIGS. 6A-6H are screen diagrams illustrating an example user flow for a search with autosuggest and with refinements in accordance with some embodiments.
Figure 6B:
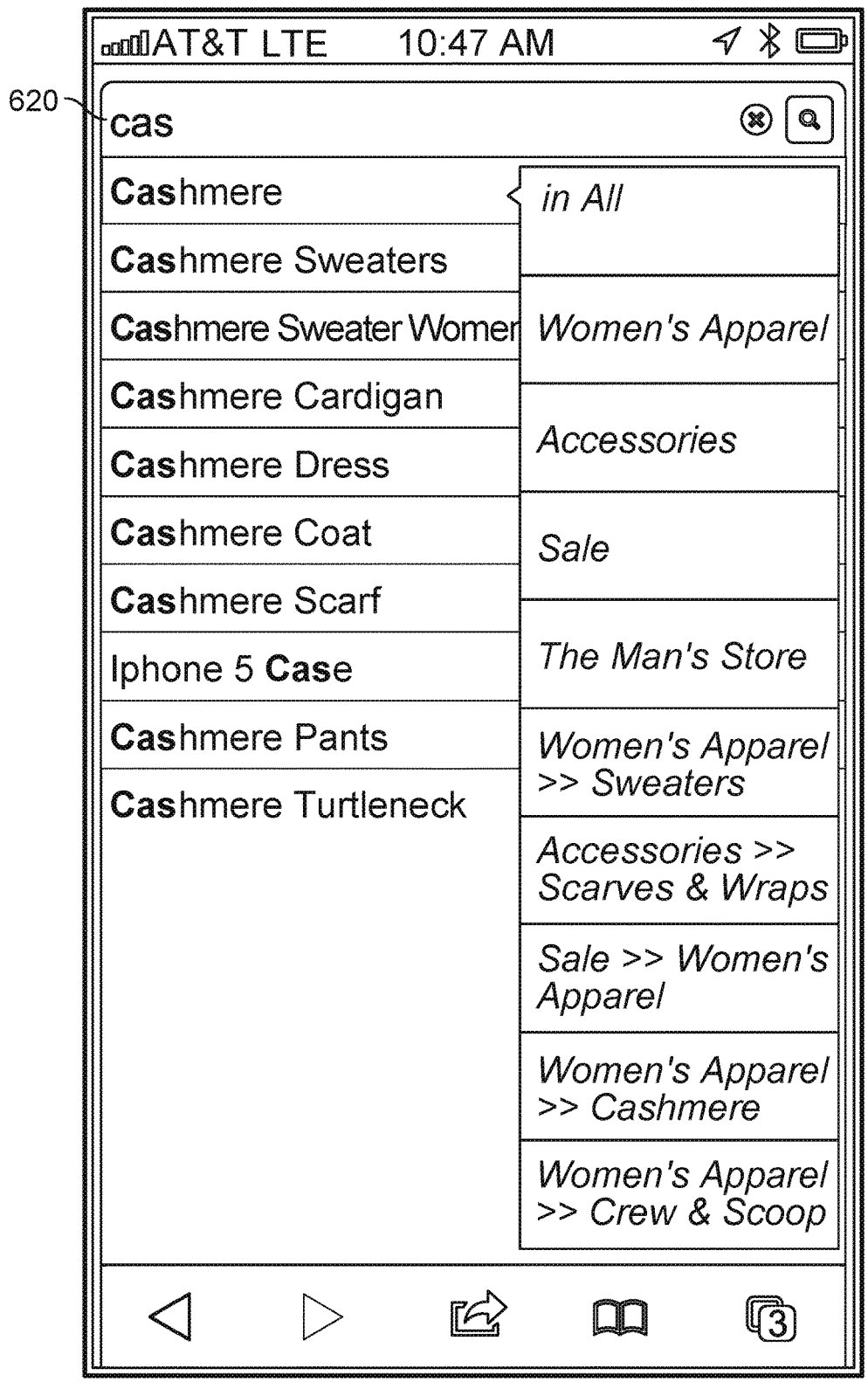
Figure 6C:
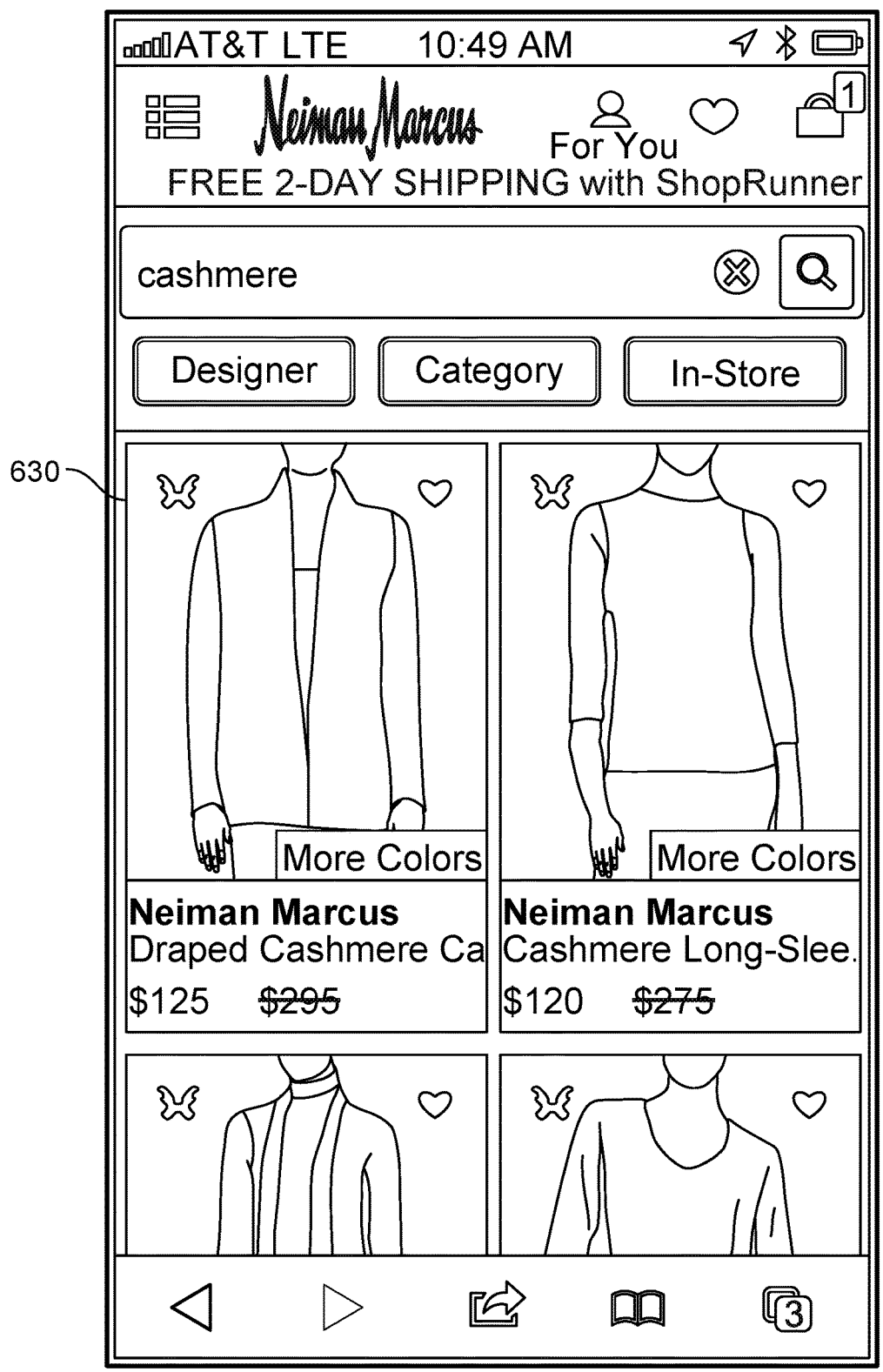
Figure 6D:
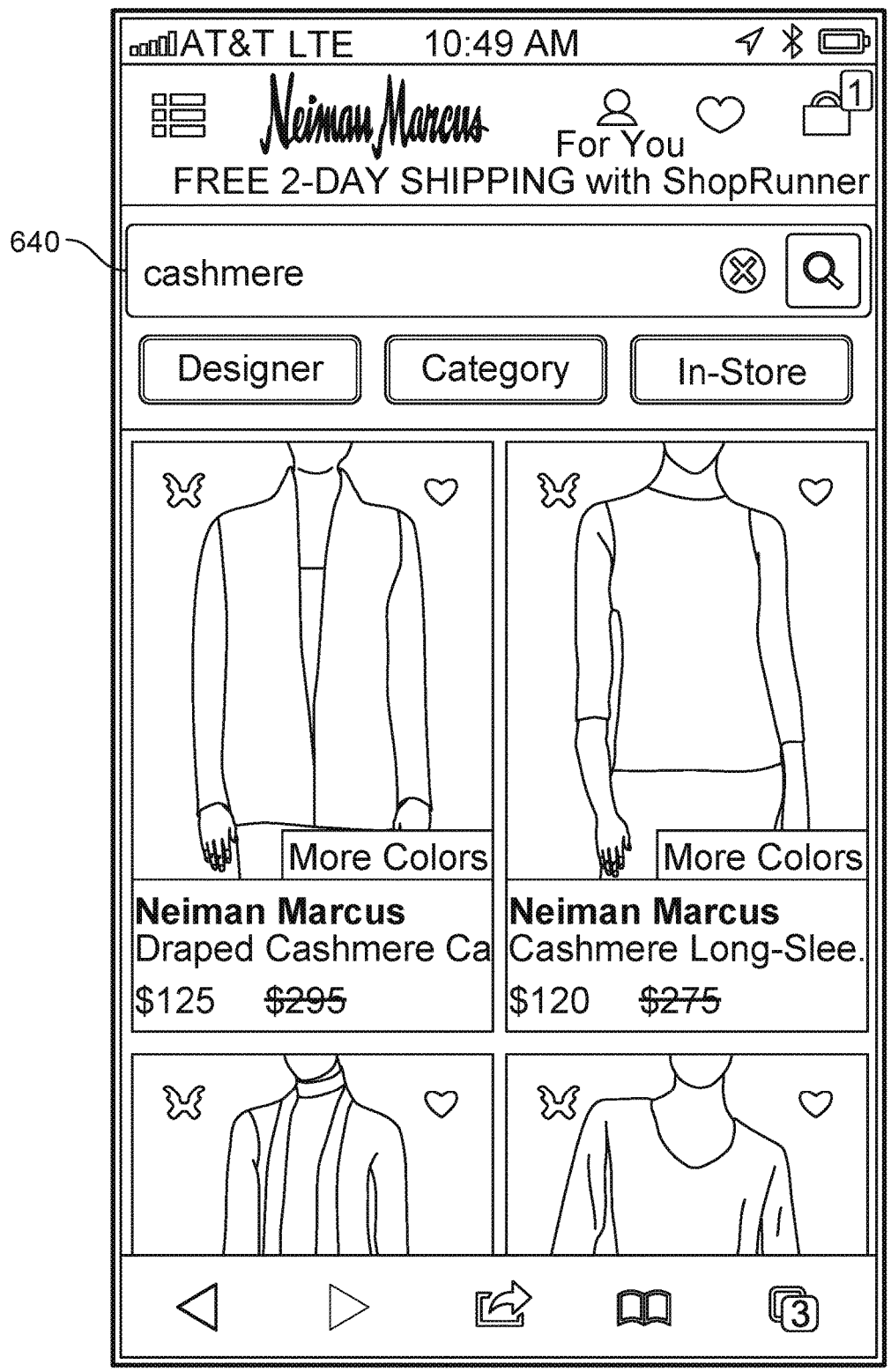
Figure 6E:
Figure 6F:
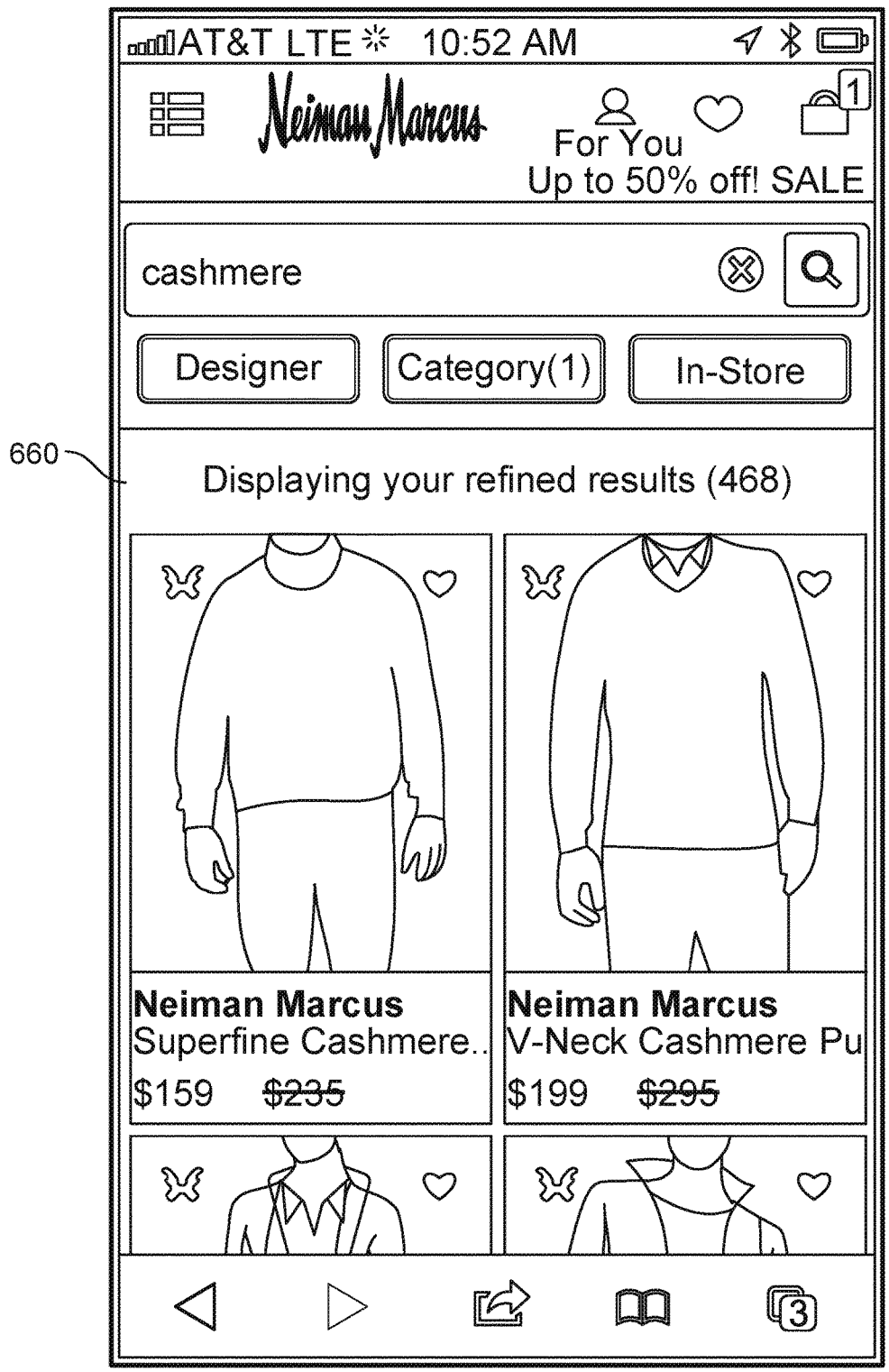
Figure 6G:
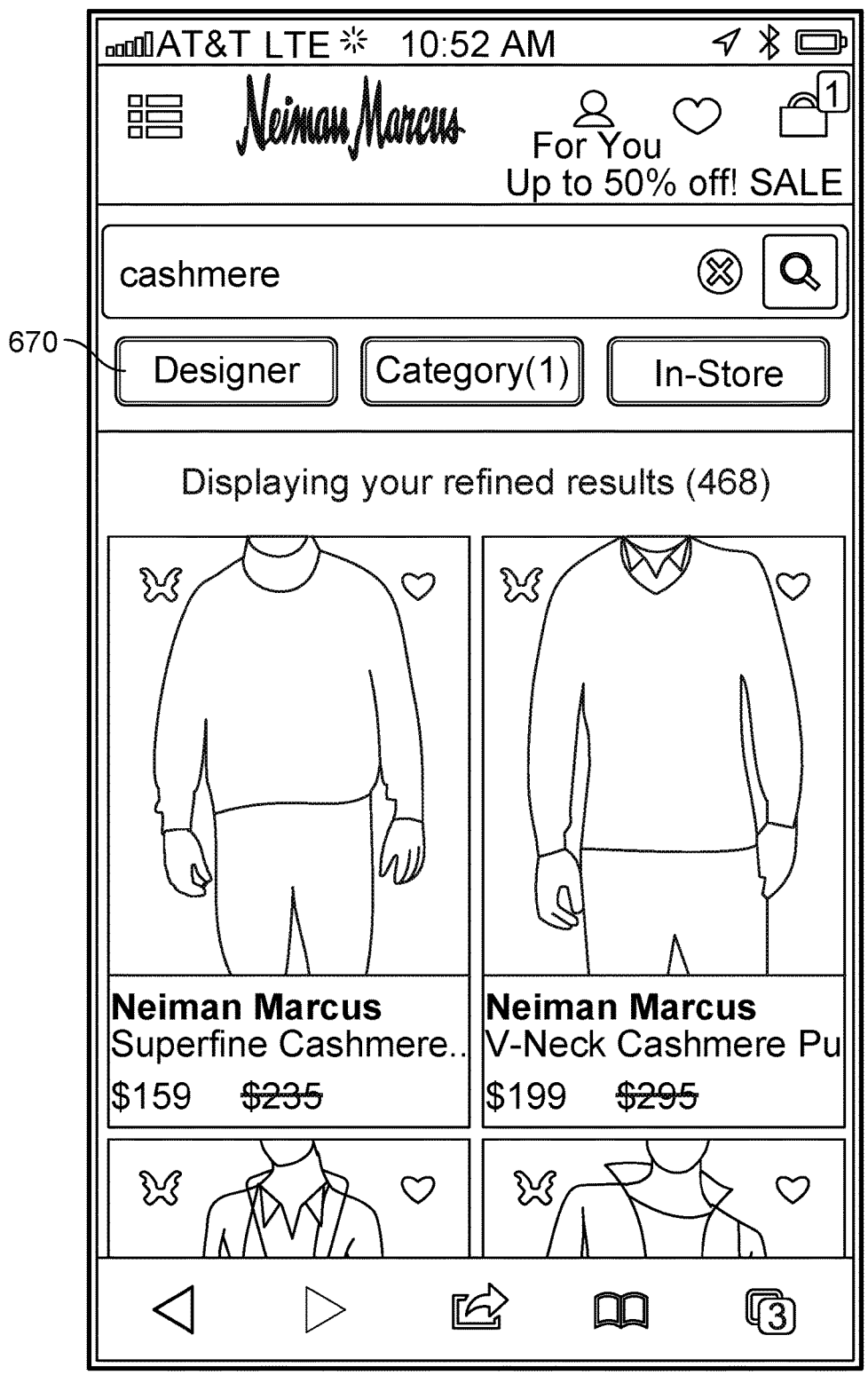
Figure 6H:
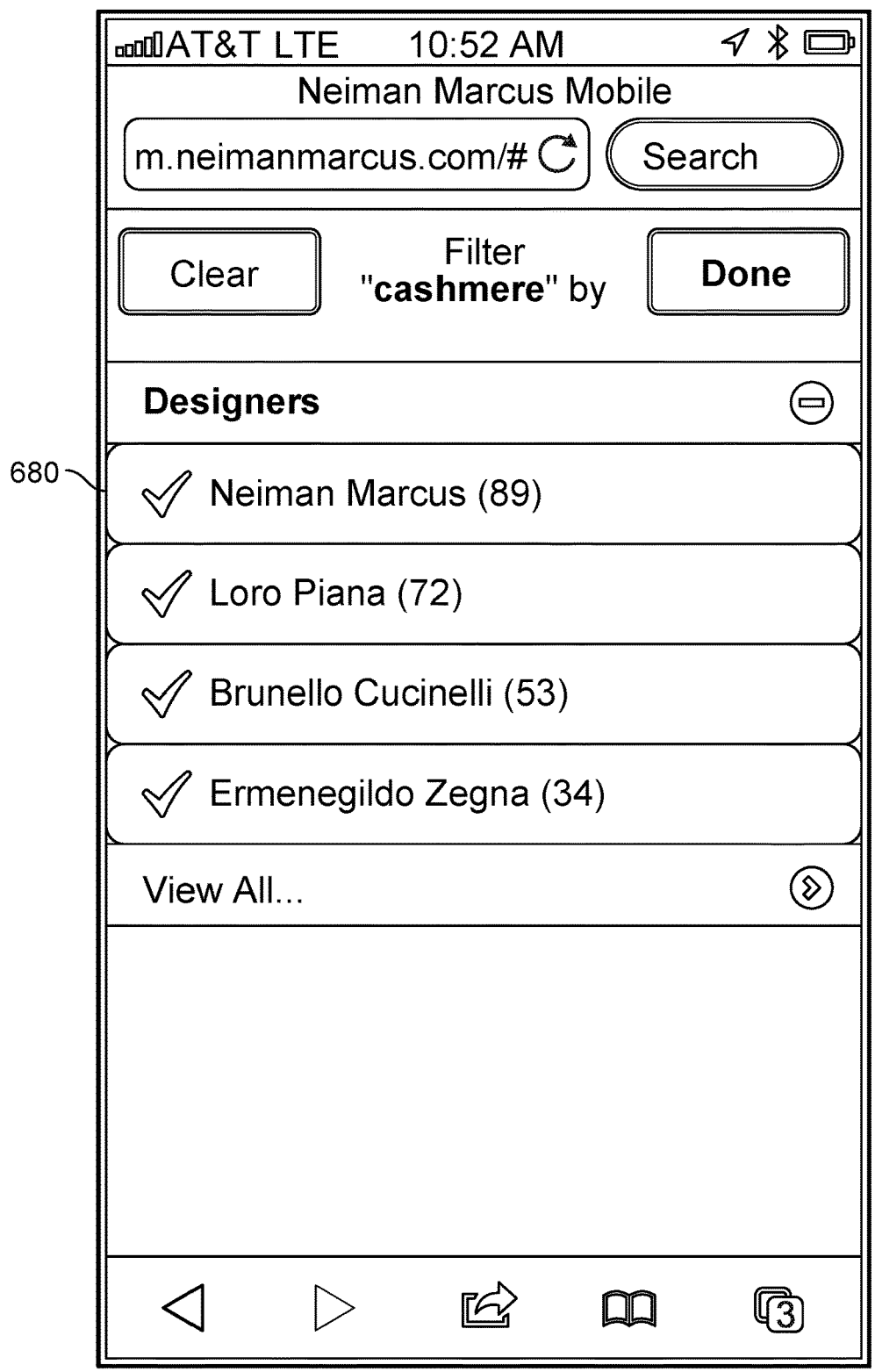

FIGS. 6A-6H are screen diagrams illustrating an example user flow for a search with autosuggest and with refinements in accordance with some embodiments. As shown in FIG. 6A, a user is presented a search box (610) on a merchant's web site for entering a search query. As shown in FIG. 6B, the user starts to type in a query in the search box (620) and selects a suggested query from the autosuggest results (e.g., typing in "cas" to search for "Cashmere"). As shown in FIG. 6C, the user lands on the page with results (630) for that search. As now shown in FIGS. 6D-6F, the user can refine a search query using the autosuggest with refinements feature. In particular, as shown in FIG. 6D, the user is on the search results page and would like to refine her search further (640). As shown in FIG. 6E, the user enters a query in the search box and selects a refinement in the right hand column (650) that was associated with her query (e.g. The Man's Store). Finally, as shown in FIG. 6F, the user lands on the page with results (660) for that refined search. Additionally, as shown in FIG. 6G, if the user wants to refine the search further, such as to a particular designer, then the user can select a filter button (670) to further refine the search results (e.g., a Designer, Category, or In-Store filter button as shown, or other refinement filters can be provided). As shown in FIG. 6H, assuming that the user selected the designer filter button as shown in FIG. 6G, then the search with refinement results (680) are displayed. In some implementations, such results are displayed based on popularity of such search with refinement results (e.g., as shown with the numbers enclosed in parentheticals associated with each designer result displayed in a ranked order (680)), and/or the user can select View All to view all of the search with refinements results.

Figure 7A:
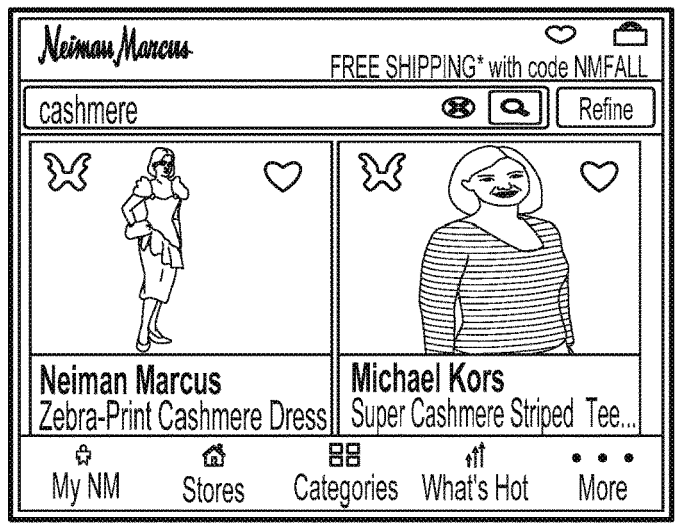
FIGS. 7A-7C are screen diagrams illustrating an example user flow for a search with refinements in accordance with some embodiments.
Figure 7B:
Figure 7C:
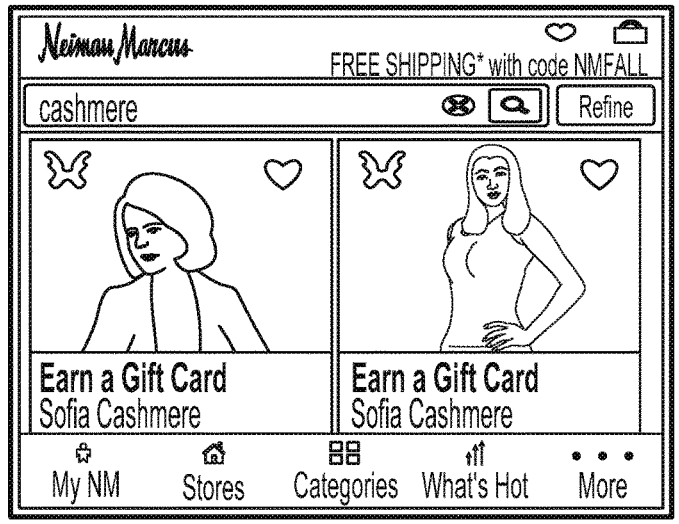

FIGS. 7A-7C are screen diagrams illustrating an example user flow for a search with refinements in accordance with some embodiments. In particular, FIGS. 7A-7C illustrate a user flow in which a user can refine a search query using a refinements box. As shown at FIG. 7A, a user is on the search results page and would like to refine her search further. As shown at FIG. 7B, the user clicks on the "Refine" box and selects a suggested refinement (e.g., Accessories). As shown at FIG. 7C, the user lands on the page with results for that refined search.

Figure 8:
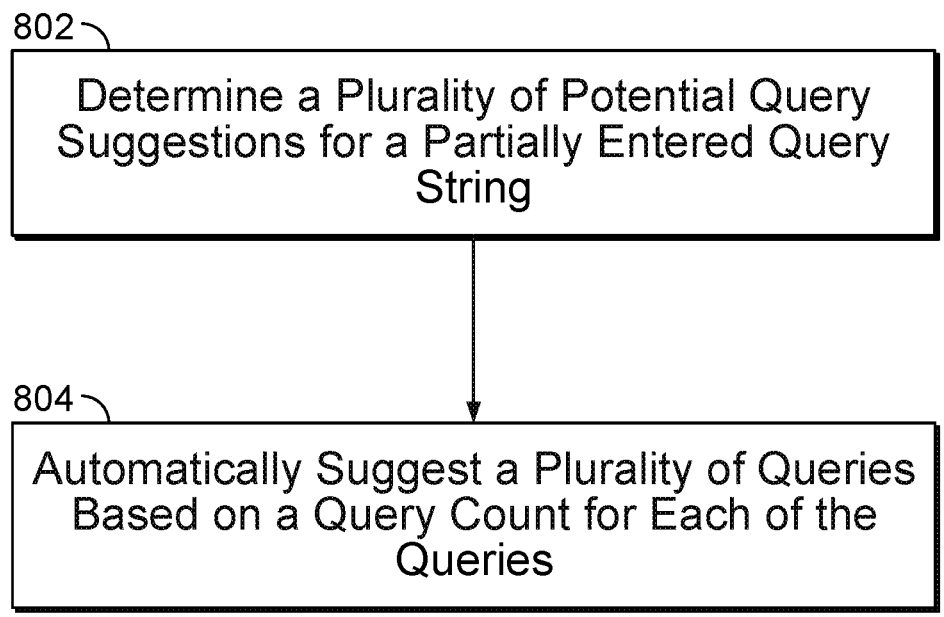
FIG. 8 is a flow diagram illustrating a process for providing search with autosuggest and refinements in accordance with some embodiments.

FIG. 8 is a flow diagram illustrating a process for providing search with autosuggest and refinements in accordance with some embodiments. In some embodiments, the process for providing search with autosuggest and refinements is performed using the AutoSuggest system/service described above with respect to FIGS. 1-4.

Referring to FIG. 8, at 802, determining a plurality of potential query suggestions for a partially entered query string is performed. At 804, automatically suggesting a plurality of queries based on a query count for each of the queries is performed. For example, the query count can correspond to a popularity of the query. In some implementations, the query count can be determined based on a number of times that the query was received, and the plurality of queries can be listed based on the popularity of each of the plurality of queries (e.g., to facilitate display of more popular queries higher in the list of suggested queries).

Figure 9:
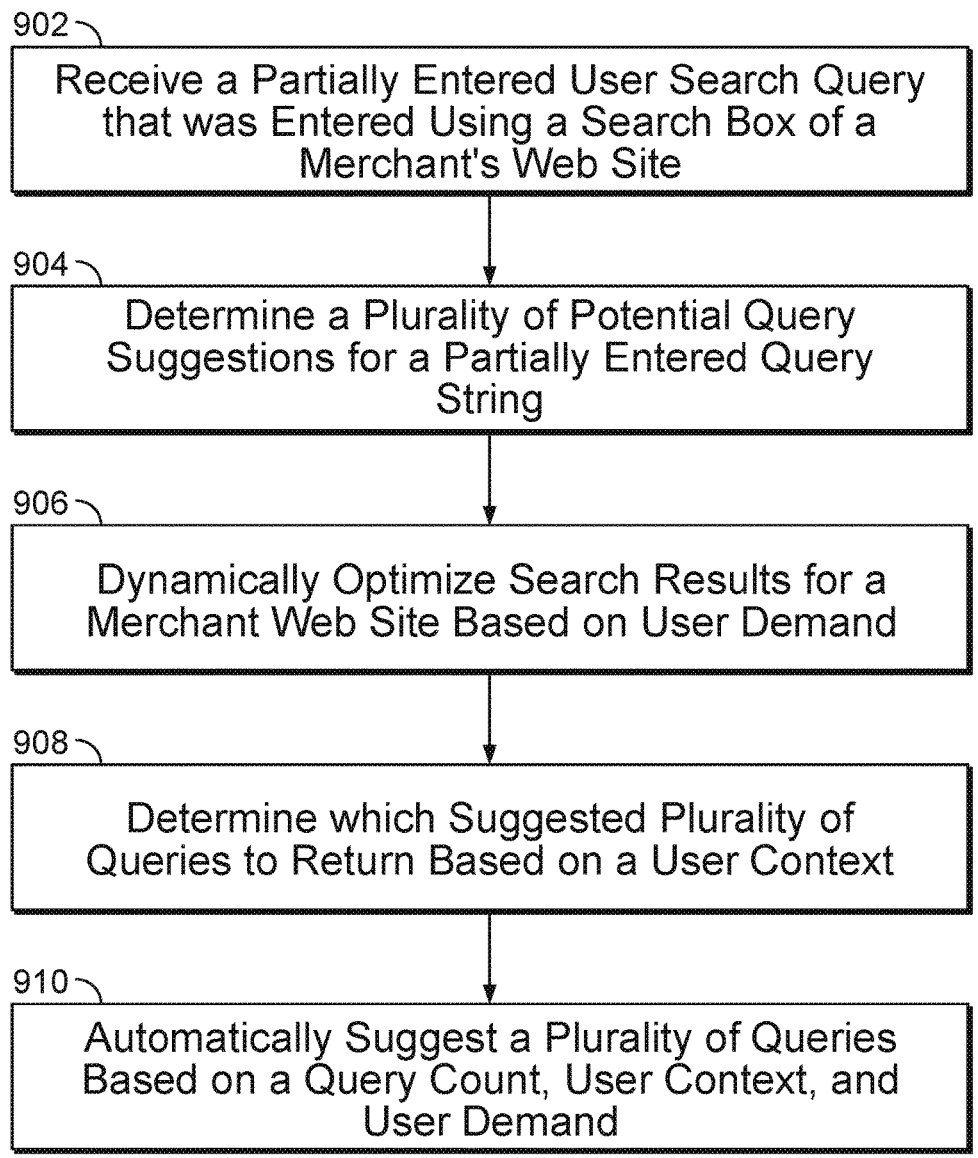
FIG. 9 is another flow diagram illustrating a process for providing search with autosuggest and refinements in accordance with some embodiments.

FIG. 9 is another flow diagram illustrating a process for providing search with autosuggest and refinements in accordance with some embodiments.

In some embodiments, the process for providing search with autosuggest and refinements is performed using the AutoSuggest system/service described above with respect to FIGS. 1-4.

Referring to FIG. 9, at 902, a partially entered user search query is received, in which that partially entered search query was entered by a user using a search box of a merchant's web site. At 904, determining a plurality of potential query suggestions for a partially entered query string is performed. At 906, dynamically optimizing search results for a merchant web site based on user demand is performed. At 908, determining which suggested plurality of queries to return based on a user context is performed. At 910, automatically suggesting a plurality of queries based on a query count, user context, and user demand is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for search with autosuggest, comprising:
a processor configured to:
determine a plurality of potential query suggestions for a partially entered query string;
merge a plurality of categories associated with a merchant web site into a merged category, comprising to:
determine a first weight for a first category based on a first query count associated with the first category;
determine a second weight for a second category based on a second query count associated with the second category, the plurality of categories including the first category and the second category; and
merge the first category and the second category into a single merged category, the single merged category being associated with the merged category, wherein the merging of the first category and the second category comprises to:
aggregate the first weight and the second weight to obtain a merged weight, the merged weight being associated with the merged category; and automatically suggest a plurality of queries based on a query count for each of the queries, wherein at least one of the automatically suggested plurality of queries corresponds to the merged category; and a memory coupled to the processor and configured to provide the processor with instructions.

2. The system recited in claim 1, wherein the query count corresponds to a popularity of the query.

3. The system recited in claim 1, wherein the query count corresponds to a popularity of the query, and wherein the query count is determined based on a number of times that the query was received.

4. The system recited in claim 1, wherein the query count corresponds to a popularity of the query, and wherein the plurality of queries are listed based on a popularity of each of the plurality of queries.

5. The system recited in claim 1, wherein the processor is further configured to:
dynamically optimize search results for a merchant web site based on user demand for automatically suggesting the plurality of queries.

6. The system recited in claim 1, wherein the processor is further configured to:
determine a weight for each of a plurality of potential search query suggestions based on the query count.

7. The system recited in claim 1, wherein the processor is further configured to:
determine that the partially entered query string is associated with product or category of a merchant web site.

8. The system recited in claim 1, wherein the processor is further configured to:
determine a number of automatically suggested plurality of queries to return based on a device platform.

9. A method of search with autosuggest, comprising:
determining a plurality of potential query suggestions for a partially entered query string;
merging a plurality of categories associated with a merchant web site into a merged category, comprising:
determining a first weight for a first category based on a first query count associated with the first category;
determining a second weight for a second category based on a second query count associated with the second category, the plurality of categories including the first category and the second category; and
merging the first category and the second category into a single merged category, the single merged category being associated with the merged category, wherein the merging of the first category and the second category comprises:
aggregating the first weight and the second weight to obtain a merged weight, the merged weight being associated with the merged category; and
automatically suggesting a plurality of queries based on a query count for each of the queries, wherein at least one of the automatically suggested plurality of queries corresponds to the merged category.

10. The method of claim 9, wherein the query count corresponds to a popularity of the query.

11. The method of claim 9, wherein the query count corresponds to a popularity of the query, and wherein the query count is determined based on a number of times that the query was received.

12. The method of claim 9, wherein the query count corresponds to a popularity of the query, and wherein the plurality of queries are listed based on a popularity of each of the plurality of queries.

13. The method of claim 9, further comprising:
determining a number of automatically suggested plurality of queries to return based on a device platform.

14. A computer program product for search with autosuggest, the computer program product being embodied in a tangible non-transitory computer readable storage medium and comprising computer instructions for:
determining a plurality of potential query suggestions for a partially entered query string;
merging a plurality of categories associated with a merchant web site into a merged category, comprising:
determining a first weight for a first category based on a first query count associated with the first category;
determining a second weight for a second category based on a second query count associated with the second category, the plurality of categories including the first category and the second category; and
merging the first category and the second category into a single merged category, the single merged category being associated with the merged category, wherein the merging of the first category and the second category comprises:
aggregating the first weight and the second weight to obtain a merged weight, the merged weight being associated with the merged category; and
automatically suggesting a plurality of queries based on a query count for each of the queries, wherein at least one of the automatically suggested plurality of queries corresponds to the merged category.

15. The computer program product recited in claim 14, wherein the query count corresponds to a popularity of the query.

16. The computer program product recited in claim 14, wherein the query count corresponds to a popularity of the query, and wherein the query count is determined based on a number of times that the query was received.

17. The computer program product recited in claim 14, wherein the query count corresponds to a popularity of the query, and wherein the plurality of queries are listed based on a popularity of each of the plurality of queries.

18. The computer program product recited in claim 14, further comprising computer instructions for:
determining a number of automatically suggested plurality of queries to return based on a device platform.

* * * * *